US012653163B2

(12) United States Patent
Zhang et al.

(10) Patent No.: US 12,653,163 B2
(45) Date of Patent: Jun. 16, 2026

(54) BREEDER CHICKEN PARAMETER MEASUREMENT INSTRUMENT IN WHICH VISIBLE-LIGHT CAMERA AND INFRARED CAMERA ARE COMBINED, AND FLEXIBLE GRIPPER

(71) Applicant: SOUTH CHINA AGRICULTURAL UNIVERSITY, Guangzhou City (CN)

(72) Inventors: Tiemin Zhang, Guangzhou (CN); Hongzhi Zhao, Guangzhou (CN); Haikun Zheng, Guangzhou (CN); Chuang Ma, Guangzhou (CN); Zeying Li, Guangzhou (CN)

(73) Assignee: SOUTH CHINA AGRICULTURAL UNIVERSITY, Guangzhou City (CN)

( * ) Notice: Subject to any disclaimer, the term of this patent is extended or adjusted under 35 U.S.C. 154(b) by 0 days.

(21) Appl. No.: 19/108,186

(22) PCT Filed: May 17, 2023

(86) PCT No.: PCT/CN2023/094894
§ 371 (c)(1),
(2) Date: Mar. 3, 2025

(87) PCT Pub. No.: WO2024/066397
PCT Pub. Date: Apr. 4, 2024

(65) Prior Publication Data
US 2026/0000057 A1      Jan. 1, 2026

(30) Foreign Application Priority Data
Sep. 29, 2022      (CN) .......................... 202211197365.9

(51) Int. Cl.
*A01K 37/00*          (2006.01)
*G01B 11/08*          (2006.01)
(Continued)

(52) U.S. Cl.
CPC .............. *A01K 37/00* (2013.01); *G01B 11/08* (2013.01); *G01G 17/08* (2013.01); *H04N 23/11* (2023.01)

(58) Field of Classification Search
CPC ...................................................... A01K 37/00
See application file for complete search history.

(56) References Cited

U.S. PATENT DOCUMENTS 3,044,109 A * 7/1962 Wayne ............... A22C 21/0007
452/188
3,289,245 A * 12/1966 Van Dolah et al. ........................
A22C 21/0007
452/74
(Continued)

FOREIGN PATENT DOCUMENTS

CN          205175528          4/2016
CN          113108881          7/2021
(Continued)

*Primary Examiner* — Magdalena Topolski
*Assistant Examiner* — Spencer T Callaway
(74) *Attorney, Agent, or Firm* — JMB Davis Ben-David

(57) ABSTRACT

The present invention belongs to the technical field of the breeding industry, and particularly relates to a breeder chicken parameter measurement instrument in which a visible-light camera and an infrared camera are combined, and a flexible gripper. Said breeder chicken parameter measurement instrument comprises a frame, a breeder chicken weighing device, a camera device, an all-in-one touch computer and a flexible gripper; by using a combined infrared camera and visible-light camera, the camera device acquires key features of chicken feet by means of temperature information of the chicken feet, thereby solving the problem of shooting being affected by the shielding of breeder chicken feathers, and improving the data shooting precision; the flexible gripper is used for suspending and fixing breeder chickens, so as to effectively protect the (Continued)

chicken feet of the breeder chickens; the camera device and the breeder chicken weighing device transmit to the all-in-one touch computer corresponding measured data to be fit, so as to rapidly and accurately acquire performance parameters, such as shank lengths, shank circumferences, and weights, of the breeder chickens.

10 Claims, 9 Drawing Sheets

(51) Int. Cl.
  G01G 17/08 (2006.01)
  H04N 23/11 (2023.01)

(56) References Cited

U.S. PATENT DOCUMENTS

2004/0147213 A1* 7/2004 Kerstholt ........... A22C 21/0046
                                                  452/178
2014/0202834 A1* 7/2014 Hazenbroek ....... A22C 21/0053
                                                  198/678.1

FOREIGN PATENT DOCUMENTS

| | | |
|---|---|---|
| CN | 113551749 | 10/2021 |
| CN | 115695967 | 2/2023 |
| KR | 20210020278 | 2/2021 |
| KR | 102246981 | 4/2021 |
| WO | 2024066397 | 4/2024 |

* cited by examiner

14

15

16

14

15

16

BREEDER CHICKEN PARAMETER MEASUREMENT INSTRUMENT IN WHICH VISIBLE-LIGHT CAMERA AND INFRARED CAMERA ARE COMBINED, AND FLEXIBLE GRIPPER

CROSS-REFERENCE TO RELATED APPLICATIONS

This is the U.S. National Stage of International Patent Application No. PCT/CN2023/094894, filed on May 17, 2023, which in turn claims the priority of Chinese Patent Application 202211197365.9 filed Sep. 29, 2022.

TECHNICAL FIELD

The present disclosure belongs to the technical field of the breeding industry, and particularly relates to a breeder chicken parameter measurement instrument with visible-light and infrared cameras combined, and a flexible gripper.

BACKGROUND

In the actual production of breeder chicken farming, the skeleton and weight of a breeder chicken are often used as important performance indicators to measure the growth and development of the breeder chicken, while the skeleton performance parameters of the breeder chicken are usually based on a shank length and a shank circumference of the breeder chicken.

At present, most chicken farms still acquire the shank length, the shank circumference, and the weight of the breeder chicken by manual measurement, which is not only time-consuming and labor-consuming, but also likely to cause damage to the breeder chicken during the measurement, affecting the economic value of the breeder chicken. The body surface of the breeder chicken is covered by feathers which have a great influence on the parameter measurement of the breeder chicken. Therefore, even if the farm measures the parameter size of the breeder chicken by manual measurement methods, the measurement precision and stability therefor are not high. Therefore, a measurement instrument is now urgently needed to rapidly and precisely acquire the shank length, the shank circumference, and the weight of the breeder chicken.

SUMMARY OF THE INVENTION

A first object of the present disclosure is to provide a flexible gripper in order to overcome the disadvantages of the prior art. The flexible gripper has the advantages of simple operation, good applicability, protection of chicken feet, and the like.

A second object of the present disclosure is to provide a breeder chicken parameter measurement instrument with visible-light and infrared cameras combined. The measurement instrument has the advantages of simple operation, high efficiency and stability, and the like.

The first object of the present disclosure may be achieved by adopting the following technical solutions.

A flexible gripper includes a hanging handle, a rod piece, a plate piece, a gripping bar made of a flexible material, and an adjusting device, wherein a top of the rod piece is arranged on the hanging handle, the plate piece is arranged at a bottom of the rod piece, the gripping bar is bent to form a gripping groove, and one end of an opening of the gripping groove is fixed to a lower end of the rod piece via the plate piece; the adjusting device comprises a connecting plate, a sliding groove, a sliding rod, a connecting rod, an adjusting handle, and a spring; the connecting plate is arranged in a middle of the hanging handle; the sliding groove is fixed to a lower part of the connecting plate; the sliding rod is arranged in the sliding groove and is connected to another end of the opening of the gripping groove; one end of the connecting rod is arranged on the adjusting handle and another end of the connecting rod is arranged on the sliding rod; the adjusting handle is slidably connected to the connecting plate; and one end of the spring is arranged on the adjusting handle and another end of the spring is arranged at a bottom of the connecting plate.

Preferably, there are two rod pieces, and the two rod pieces are fixed to two ends of the hanging handle respectively; there are two connecting plates, an upper end of each of the two connecting plates is fixed to the middle of the hanging handle, and the two connecting plates are arranged in parallel to form a sliding rail; the adjusting handle is arranged in the sliding rail; there are two sliding rods and two connecting rods, a middle of the sliding groove is fixed to the sliding rail, and the two sliding rods are located at two ends of the sliding groove; and an inner end of each of the two sliding rods is connected to the handle via a corresponding connecting rod of the two connecting rods.

Preferably, a guide groove is arranged in a middles of each of the connecting plates, and the adjusting handle is connected to the guide groove via a guide block.

Preferably, the gripping groove is U-shaped or V-shaped.

The second object of the present disclosure may be achieved by adopting the following technical solutions.

A breeder chicken parameter measurement instrument with visible-light and infrared cameras combined includes a frame, a camera device, an all-in-one touch computer, and a flexible gripper. The camera device, the flexible gripper, and the all-in-one touch computer are all arranged on the frame. The camera device is connected to the all-in-one touch computer, and the camera device includes an infrared camera, a primary visible-light camera, and a secondary visible-light camera. The infrared camera and the primary visible-light camera are arranged in juxtaposition, and shooting lenses of the infrared camera and the primary visible-light camera and a shooting lens of the secondary visible-light camera are oriented perpendicularly to each other. The shooting lenses of the infrared camera, the primary visible-light camera, and the secondary visible-light camera all face the flexible gripper.

Preferably, a breeder chicken weighing device is included. The breeder chicken weighing device includes a cross beam, T-shaped connectors, weighing sensors, and a hanging base; there are two T-shaped connectors, the two T-shaped connectors are fixed to two ends of the frame respectively, and each of two ends of the cross beam is connected to each of the two T-shaped connectors via a corresponding weighing sensor of the weighing sensors; and a top of the hanging base is connected to the cross beam, and a bottom of the hanging base is connected to the flexible gripper.

Preferably, a calibration device is included. The calibration device includes a calibration stand, a mounting rod, a porous calibration plate, a non-porous calibration plate, and an infrared heater. The calibration stand is arranged on the frame via the mounting rods and is perpendicular to a camera view direction of the infrared camera. The porous calibration plate and the non-porous calibration plate are arranged on the calibration stand, the porous calibration plate is arranged in front of the non-porous calibration plate, and the infrared heater is arranged on the frame.

Preferably, the infrared heater includes a heating block, a heat collecting hood, and a power supply. The heating block is arranged in the heat collecting hood, and the heat collecting hood is arranged on the frame.

Preferably, the camera device further includes a dust hood. The dust hood includes a bracket, a camera base, a dust hood bottom shell, a dust hood cover, and a transparent lens. The bracket is arranged on the frame, and the dust hood bottom shell is arranged on the bracket. The camera base is arranged on the dust hood bottom shell, and the dust hood cover is arranged on the dust hood bottom shell. The transparent lens is arranged in the front of the dust hood.

Preferably, wind shields are arranged around the frame, a chicken inlet-outlet window is arranged in the front of the frame, and a light shield is arranged beside the chicken inlet-outlet window.

The present disclosure has the following beneficial effects in contrast to the prior art.

1. According to the flexible gripper of the present disclosure, the gripping bar made of a flexible material is bent to form the gripping groove, so as to effectively reduce the damage to feet of the breeder chicken during the gripping, thereby reducing the influence of the breeder chicken severely shaking on data due to pain. For the flexible gripper of the present disclosure, a power supply and a control system are not required. The flexible gripper has the characteristics of compact structure, easy operation, and the like.

2. With an infrared camera and a visible-light camera combined, the camera device of the breeder chicken parameter measurement instrument with visible-light and infrared cameras combined according to the present disclosure acquires key features of chicken feet via temperature information of the chicken feet, thereby solving the problem of shooting being affected due to shielding by breeder chicken feathers, and improving the data shooting precision. The camera device and the breeder chicken weighing device transmit corresponding measured data to the all-in-one touch computer for fitting, thus rapidly and accurately acquiring performance parameters, such as shank lengths, shank circumferences, and weights, of the breeder chicken.

In the figures: 1—frame; 2—operating panel; 3—all-in-one touch computer; 4—infrared camera; 5—primary visible-light camera; 6—secondary visible-light camera; 7—bracket; 8—camera base; 9—dust hood bottom shell; 10—dust hood cover; 11—wind shield; 12—light shield; 13—breeder chicken weighing device; 14—T-shaped connector; 15—weighing sensor; 16—hanging base; 17—flexible gripper; 18—hanging handle; 19—rod; 20—plate; 21—gripping groove; 22—connecting plate; 23—sliding groove; 24—sliding rod; 25—connecting rod; 26—adjusting handle; 27—spring; 28—calibration device; 29—calibration stand; 30—mounting rod; 31—porous calibration plate; 32—non-porous calibration plate; 33—infrared heater; 34—cross beam; 35—RFID; 36—electrical appliance box.

DETAILED DESCRIPTION OF THE EMBODIMENTS

In order to make the objects, technical solutions, and advantages of the embodiments of the present disclosure clearer, the technical solutions in the embodiments of the present disclosure will be clearly and completely described below with reference to the accompanying drawings in the embodiments of the present disclosure. It is obvious that the described embodiments are part of the embodiments of the present disclosure, but not all the embodiments. All other embodiments obtained by a person of ordinary skill in the art without creative work based on the embodiments of the present disclosure belong to the scope of protection of the present disclosure.

Hereinafter, the technical solutions of the present disclosure will be further described with reference to the accompanying drawings and specific implementations.

In the description of the present disclosure, it should be understood that the orientation or positional relationship indicated by the terms "upper", "lower", "top", "bottom", "inner", "outer", etc. is based on the orientation or positional relationship shown in the accompanying drawings, and is merely intended to facilitate and simplify the description of the present disclosure, and does not indicate or imply that the referred device or element must have a specific orientation, be constructed and operate in a specific orientation, and therefore cannot be construed as limiting the present disclosure.

Embodiment

Figure 1:
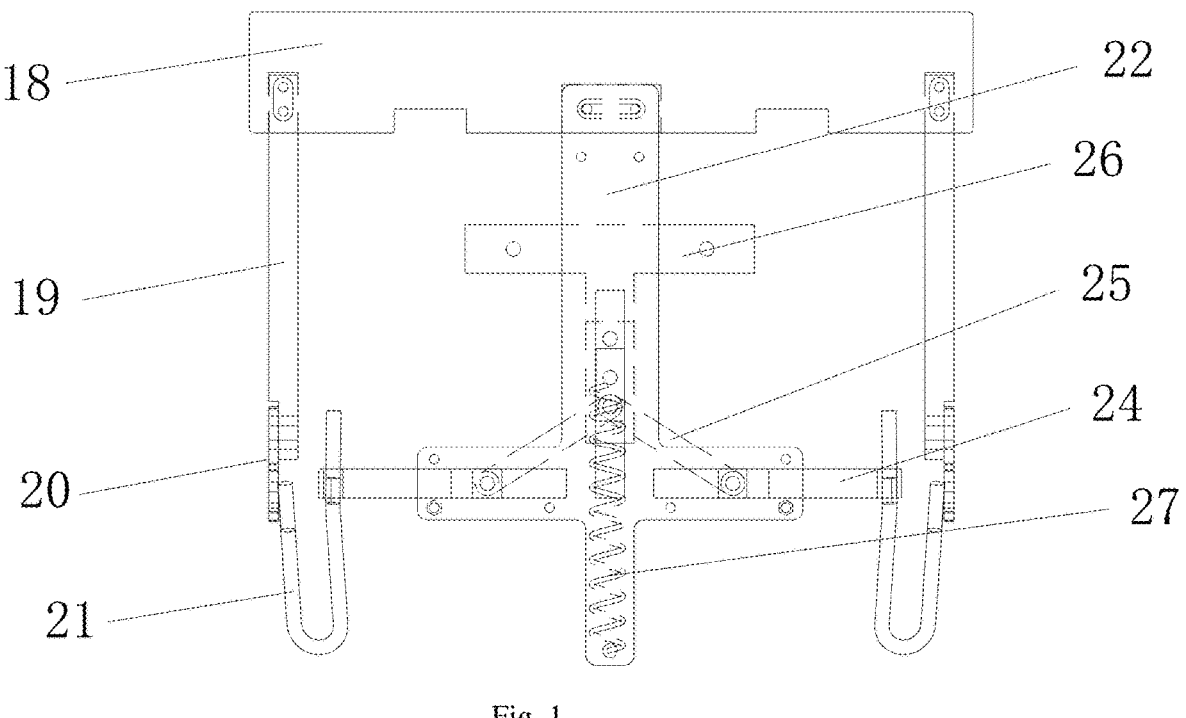
FIG. 1 is a front view of a flexible gripper according to an embodiment of the present disclosure.
Figure 2:
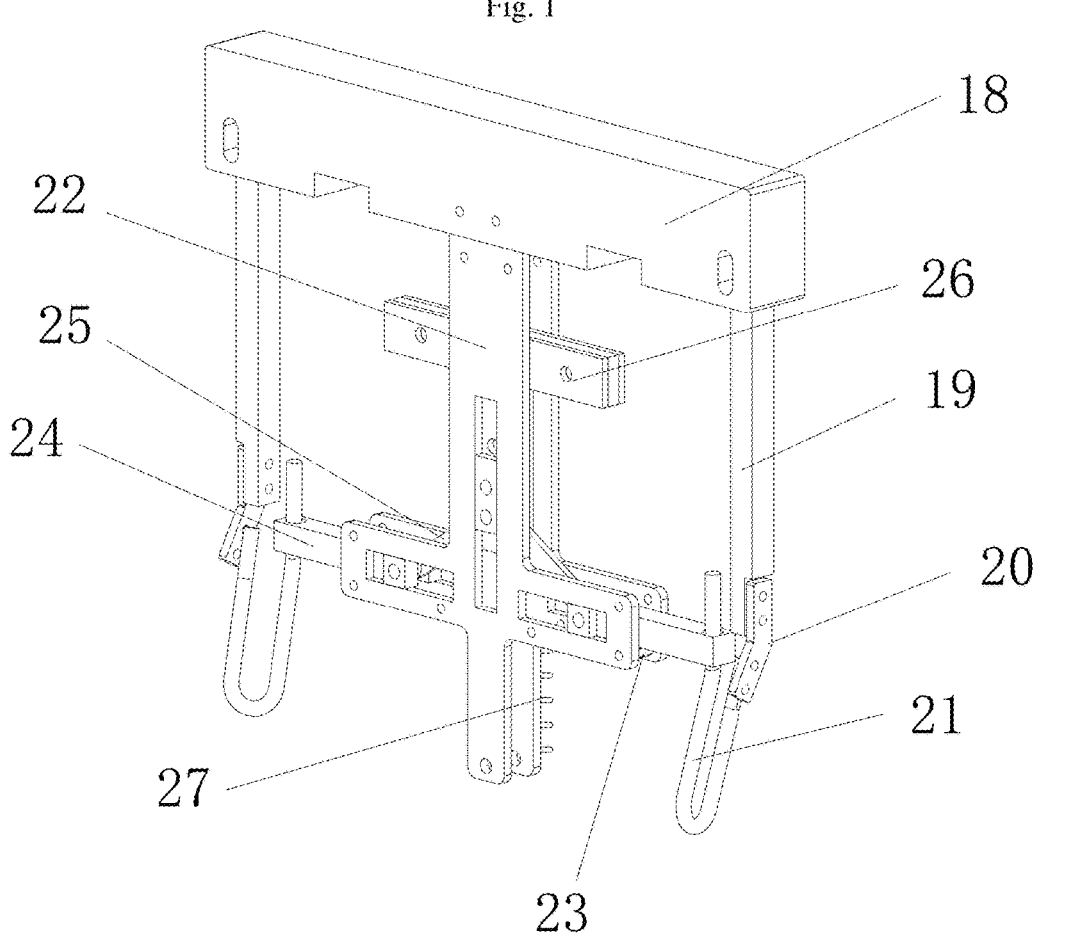
FIG. 2 is a perspective view of a flexible gripper according to an embodiment of the present disclosure.
Figure 3:
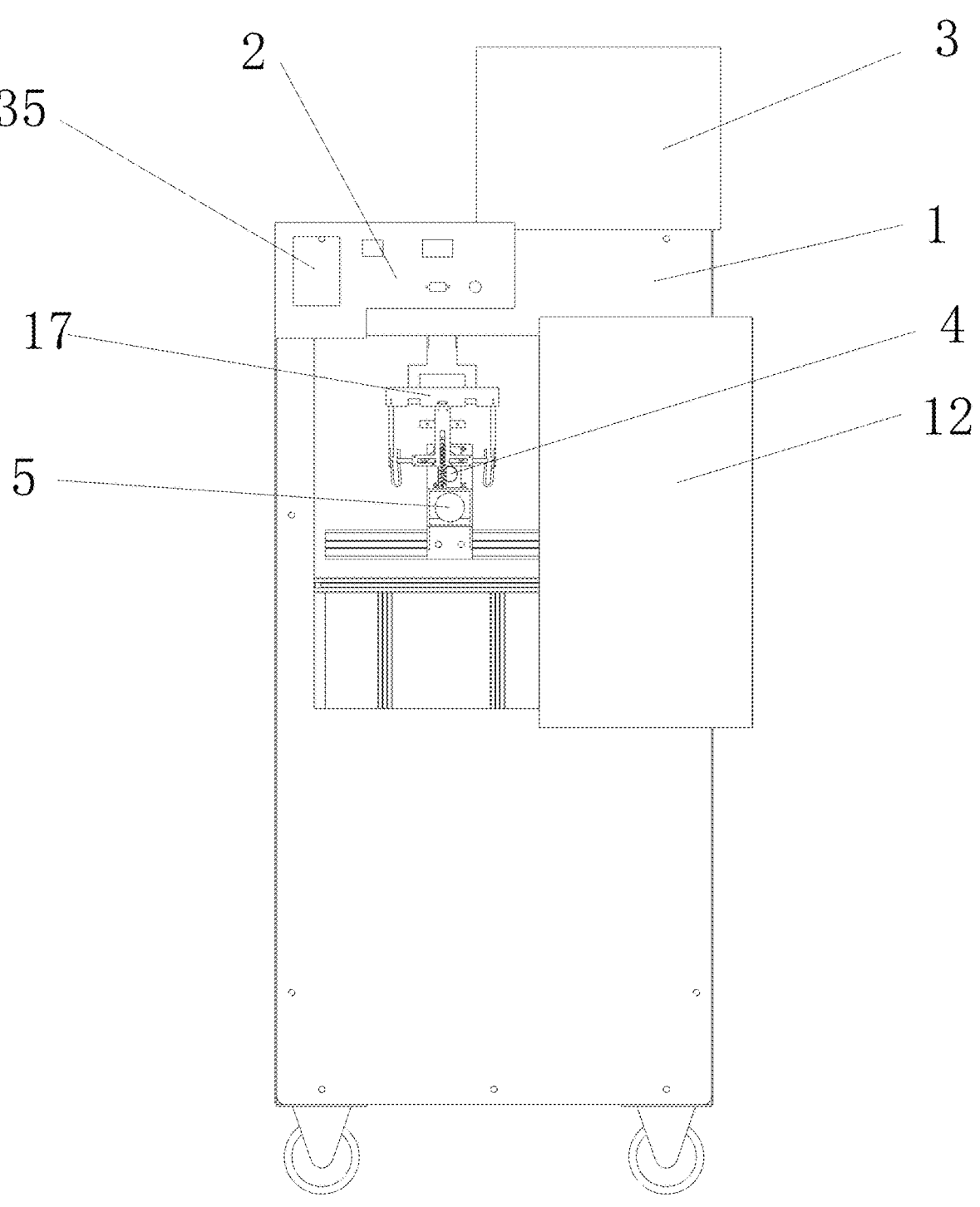
FIG. 3 is a front view of a breeder chicken parameter measurement instrument with visible-light and infrared cameras combined according to an embodiment of the present disclosure.
Figure 4:
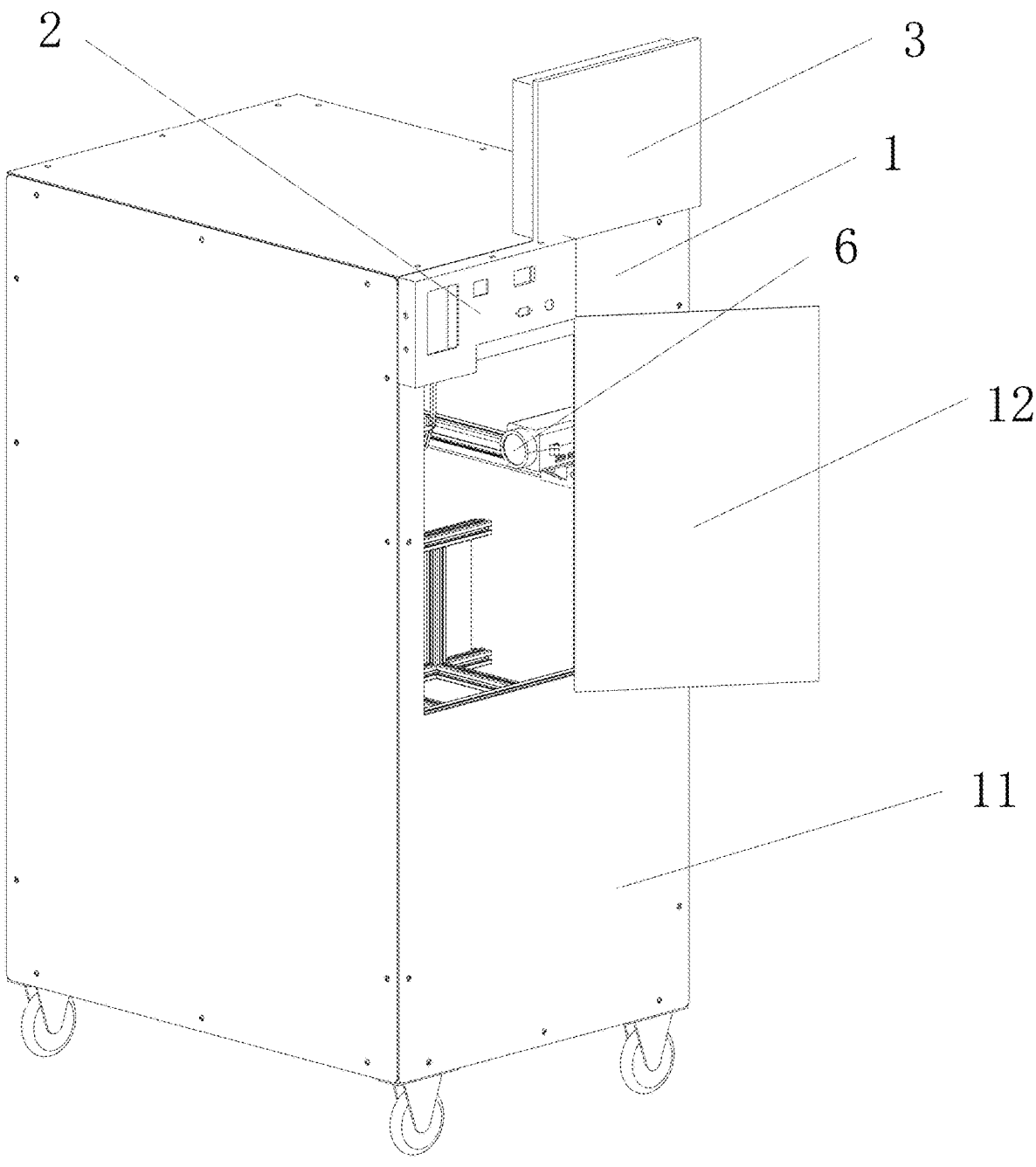
FIG. 4 is a perspective view of a breeder chicken parameter measurement instrument with visible-light and infrared cameras combined according to an embodiment of the present disclosure, where an infrared heater is omitted.
Figure 5:
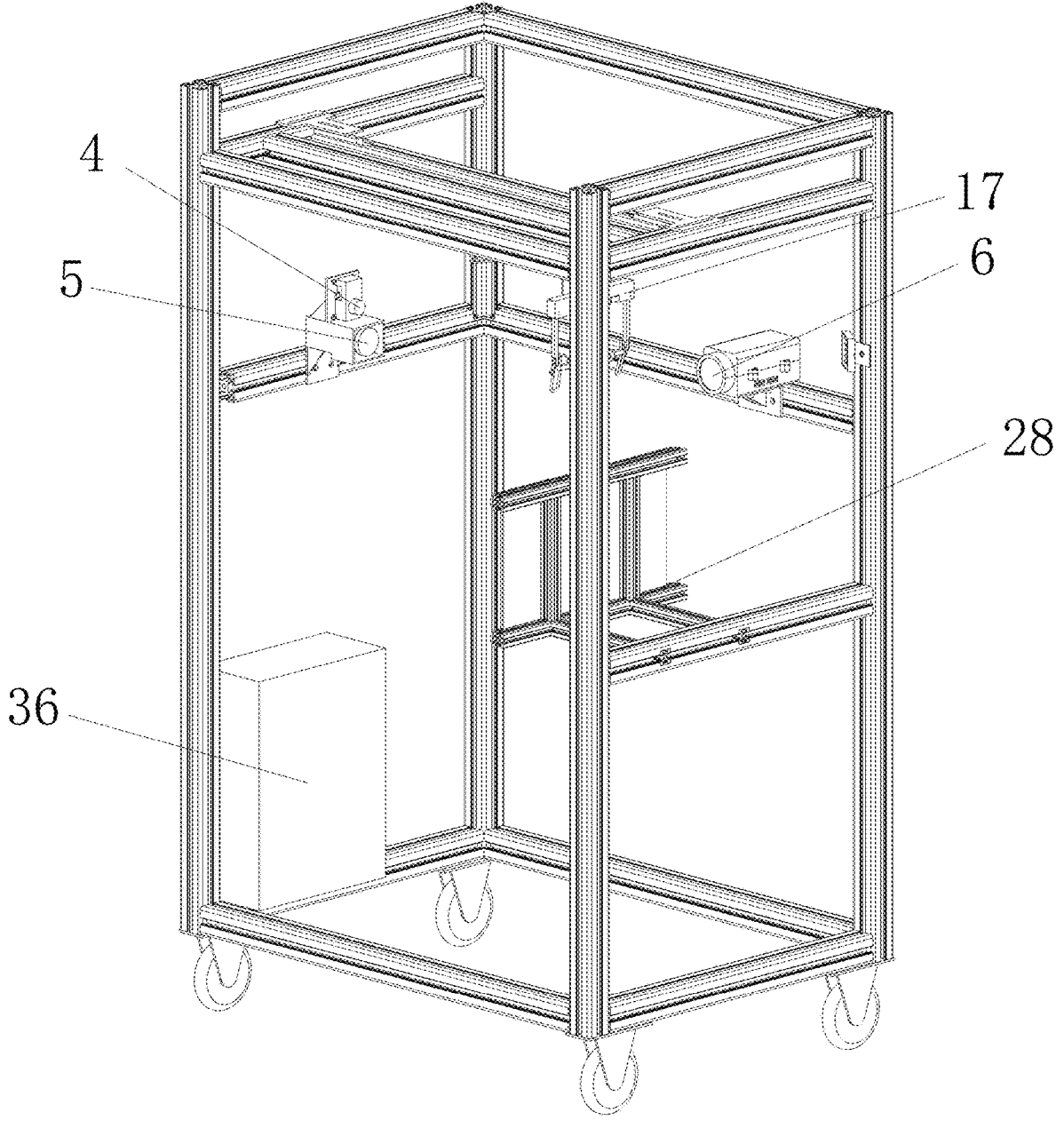
FIG. 5 is a perspective sectional view of a breeder chicken parameter measurement instrument with visible-light and infrared cameras combined according to an embodiment of the present disclosure, where an infrared heater is omitted.
Figure 6:
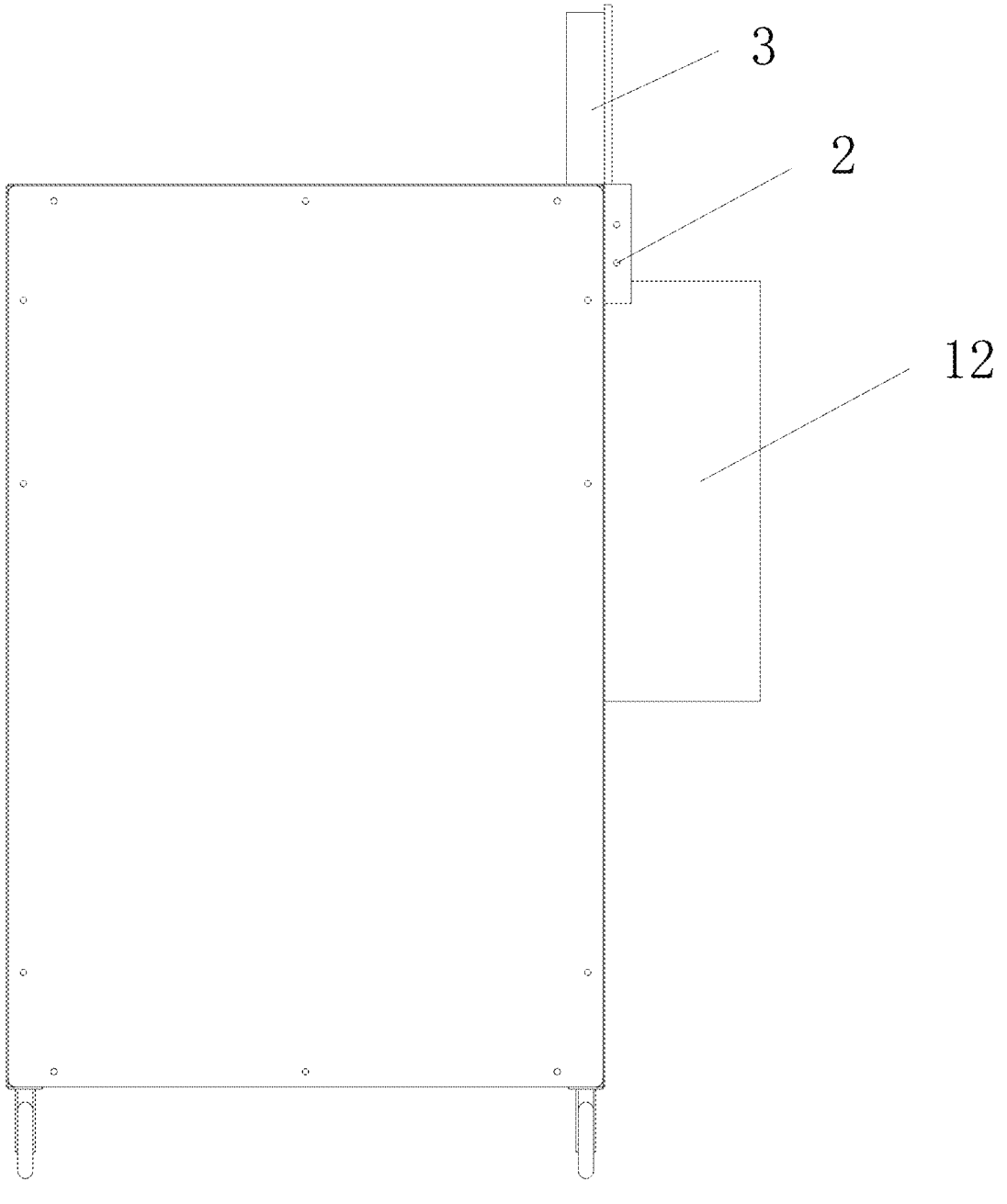
FIG. 6 is a left view of a breeder chicken parameter measurement instrument with visible-light and infrared cameras combined according to an embodiment of the present disclosure.
Figure 7:
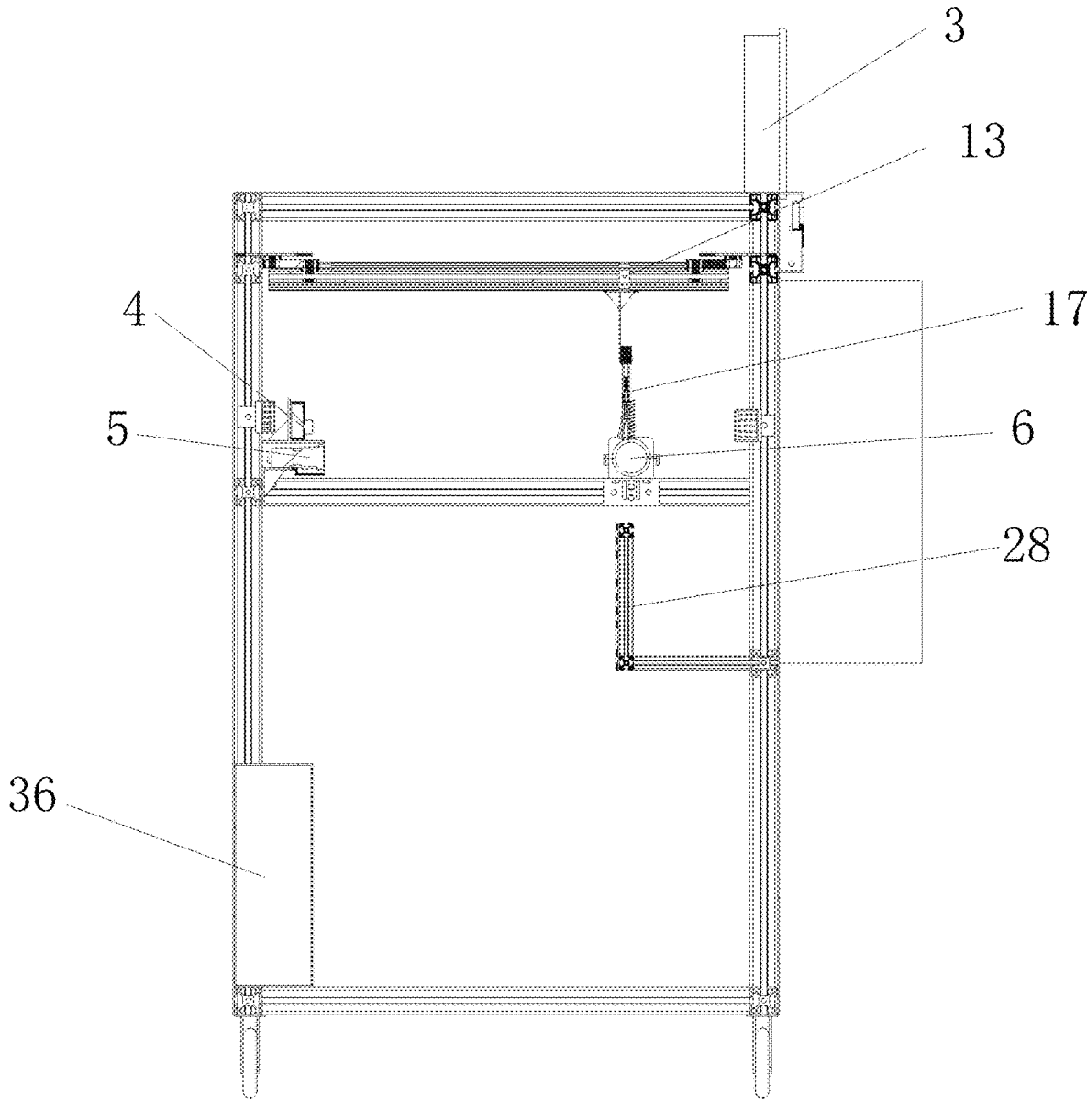
FIG. 7 is a left sectional view of a breeder chicken parameter measurement instrument with visible-light and infrared cameras combined according to an embodiment of the present disclosure, where an infrared heater is omitted.

As shown in FIG. 1 to FIG. 2, a flexible gripper 17 includes a hanging handle 18, rods 19, plates 20, gripping bars made of a flexible material, and an adjusting device. The top of the rod 19 is arranged on the hanging handle 18, the plate 20 is arranged at the bottom of the rod 19, the gripping bar is bent to form a gripping groove 21, and one end of an opening of the gripping groove 21 is fixed to a lower end of the rod 19 via the plate 20. The adjusting device includes connecting plates 22, a sliding groove 23, sliding rods 24, connecting rods 25, an adjusting handle 26, and a spring 27. The connecting plate 22 is arranged in the middle of the hanging handle 18. The sliding groove 23 is fixed to the lower part of the connecting plate 22. The sliding rod 24 is arranged in the sliding groove 23 and is connected to the other end of the opening of the gripping groove 21. One end of the connecting rod 25 is arranged on the adjusting handle 26 and the other end is arranged on the sliding rod 24. The adjusting handle 26 is slidably connected to the connecting plate 22. One end of the spring 27 is arranged on the adjusting handle 26 and the other end is arranged at the bottom of the connecting plate 22.

Specifically, the gripping groove 21 is formed by a gripping bar made of a flexible material, which effectively protects chicken feet under the condition of ensuring the gripping of the chicken feet. Also, the flexible material has good flexibility, and the size of the opening of the gripping groove 21 can be adjusted by the adjusting device to be thus suitable for the use of different sizes of breeder chickens. During the use, when the adjusting handle 26 is controlled to move up along the sliding rail formed by the connecting plates 22, the two sliding rods 24 are driven to move via the connecting rods 25. That is, the sliding rods 24 located at two ends of the sliding groove move towards the middle of the sliding groove 23, and the openings of the gripping grooves 21 expand under the action of the sliding rods 24. After the sizes of the openings of the gripping grooves 21 are adjusted, chicken feet of a breeder chicken to be measured are put into the gripping grooves, and then the adjusting handle 26 is loosened. The adjusting handle 26 falls under the elastic action of the spring 27. The gripping grooves 21 automatically adapt to the chicken feet according to the characteristics of the flexible material thereof and the weight of the breeder chicken, and complete the gripping operation.

As shown in FIG. 1 to FIG. 2, there are two rods 19, and the two rods 19 are fixed to two ends of the hanging handle 18 respectively. There are two connecting plates 22, the tops of the two connecting plates 22 are both fixed to the middle of the hanging handle 18, and the two connecting plates 22 are arranged in parallel to form a sliding rail. The adjusting handle 26 is arranged in the sliding rail. There are two sliding rods 24 and two connecting rods 25, the middle of the sliding groove 23 is fixed to the sliding rail, and the two sliding rods 24 are located at two ends of the sliding groove 23 respectively. The inner ends of the two sliding rods 24 are connected to the adjusting handle 26 via the corresponding connecting rods 25. The arrangement has a simple structure and is easy to operate. The number of the two rods 19 is equal to the number of chicken feet of a single breeder chicken, and the gripping grooves 21 located below the two rods 19 grip the chicken feet of the breeder chicken, thereby ensuring the stability of gripping and ensuring the natural spreading of the breeder chicken, so as to further ensure the accuracy of detection.

As shown in FIG. 2, guide grooves are arranged in the middles of the connecting plates 22, and the adjusting handle is connected to the guide grooves via guide blocks, so as to prevent the adjusting handle 26 from sliding out of the sliding rail during sliding.

The gripping grooves 21 are U-shaped, and this U-shaped structure can better fix chicken feet of a breeder chicken, thereby improving the feasibility of the solution. The gripping grooves 21 are bent to be U-shaped, whereby the gripping grooves 21 conform to the contour of the chicken feet, which not only reduces the risk of damaging the chicken feet, but also ensures the comfort of the breeder chicken when hanging, reducing the possibility of the breeder chicken struggling, thereby further improving the accuracy of detection.

The gripping grooves 21 are made of TPU rubber, and the TPU rubber as a flexible material can effectively protect the chicken feet of the breeder chicken from damage.

Both sides of the bottom of the hanging handle 18 are provided with grooves for accommodating hooks of the hanging base 16. This arrangement further improves the stability of the flexible gripper 17 when hung at the breeder chicken weighing device 13, avoids sliding from affecting the detection result, and has the effect of improving the detection accuracy.

As shown in FIG. 3 to FIG. 7, a breeder chicken parameter measurement instrument with visible-light and infrared cameras combined includes a frame 1, a breeder chicken identity collection device, a breeder chicken weighing device 13, a camera device, a calibration device 28, an all-in-one touch computer 3, and the above flexible gripper 17. The breeder chicken identity collection device, the breeder chicken weighing device 13, the camera device, the flexible gripper 17, and the all-in-one touch computer 3 are all arranged on the frame 1. The breeder chicken identity collection device, the breeder chicken weighing device 13, and the camera device are connected to the all-in-one touch computer 3 respectively, and the camera device includes an infrared camera 4, a primary visible-light camera 5, and a secondary visible-light camera 6. The infrared camera 4 and the primary visible-light camera 5 are arranged in juxtaposition, and shooting lenses of the infrared camera 4 and the primary visible-light camera 5 and a shooting lens of the secondary visible-light camera 6 are oriented perpendicularly to each other. The shooting lenses of the infrared camera 4, the primary visible-light camera 5, and the secondary visible-light camera 6 all face the flexible gripper 17, so as to take front and side pictures of chicken feet of a breeder chicken to be measured.

Conventional cameras are often used in the current poultry measurement methods. However, the body surface of the chicken is covered with feathers, which will cover some key features of the chicken feet. Therefore, the key features of the chicken feet cannot be accurately acquired using the conventional cameras. However, in the present disclosure, the problem of feather shielding can be solved by using the infrared camera 4. The key features of the chicken feet are acquired by using temperature information of the chicken feet. Front images of the chicken feet are acquired by using the infrared camera 4 and the primary visible-light camera 5. Side images of the chicken feet are acquired by using the secondary visible-light camera 6. Shank length information may be obtained by analyzing and processing the front images. The side images also have a correction function for the shank length. The method of combining the infrared camera 4 and the visible-light cameras can control an average coefficient of variation of a measurement result to about 1.23%.

The operation steps for the breeder chicken parameter measurement instrument with visible-light and infrared cameras combined are as follows:

Firstly, coordinate calibration is performed on the infrared camera 4 and the visible-light cameras by the calibration device 28. After the coordinate calibration of the cameras is completed, a breeder chicken to be measured is taken out of a chicken cage and put into the gripping grooves 21 of the flexible gripper 17 for a gripping operation. Then the flexible gripper 17 is placed on the hanging base 16. An operating button on the operating panel 2 is pressed. At this moment, the breeder chicken weighing device 13 automatically acquires weight information of the breeder chicken. Also, the camera device acquires a front view and a side view of chicken feet of the breeder chicken and uploads the views to the all-in-one touch computer 3 for fitting calculation. Finally, information such as a weight, a shank length, and a shank circumference of the breeder chicken will be displayed on a screen of the all-in-one touch computer 3. After obtaining relevant parameter information of the breeder chicken, the flexible gripper 17 is removed from the hanging base 16, and the measured chicken is put back into the chicken cage to complete the measurement. This operation is repeated subsequently.

Figure 8:
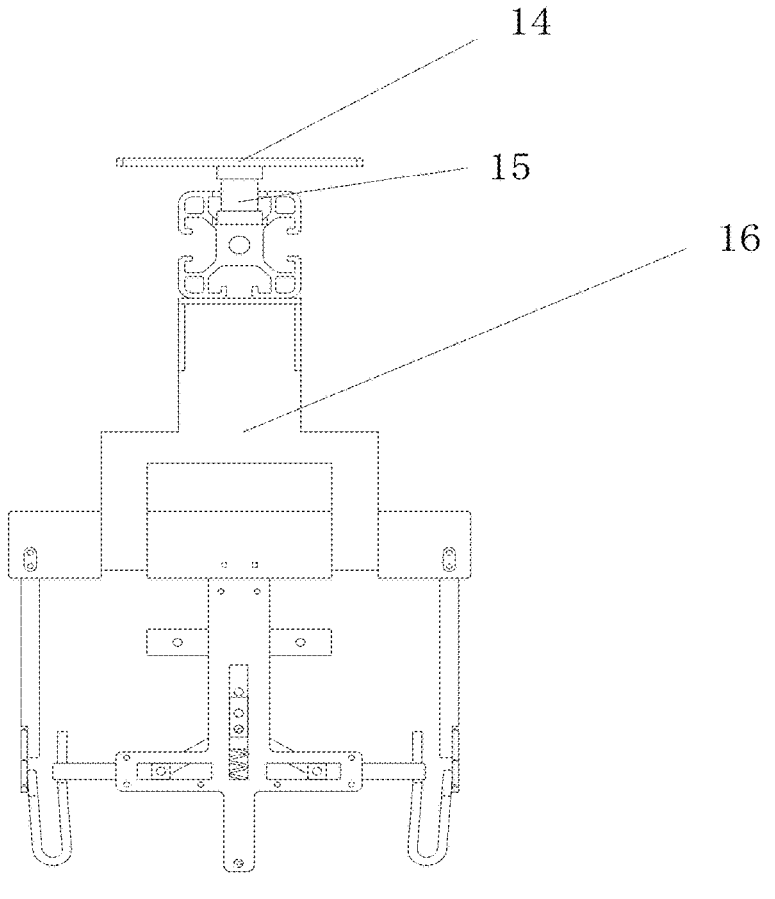
FIG. 8 is a front view of a breeder chicken weighing device according to an embodiment of the present disclosure.
Figure 9:
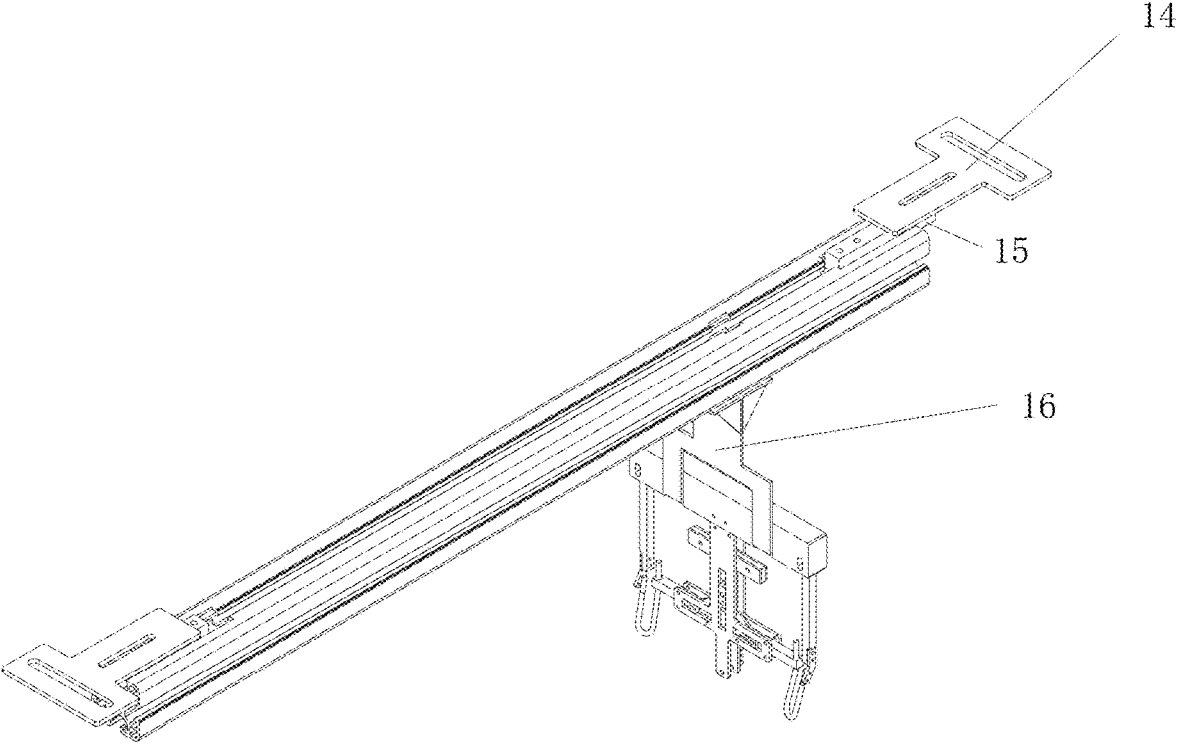
FIG. 9 is a perspective view of a breeder chicken weighing device according to an embodiment of the present disclosure.
Figure 10:
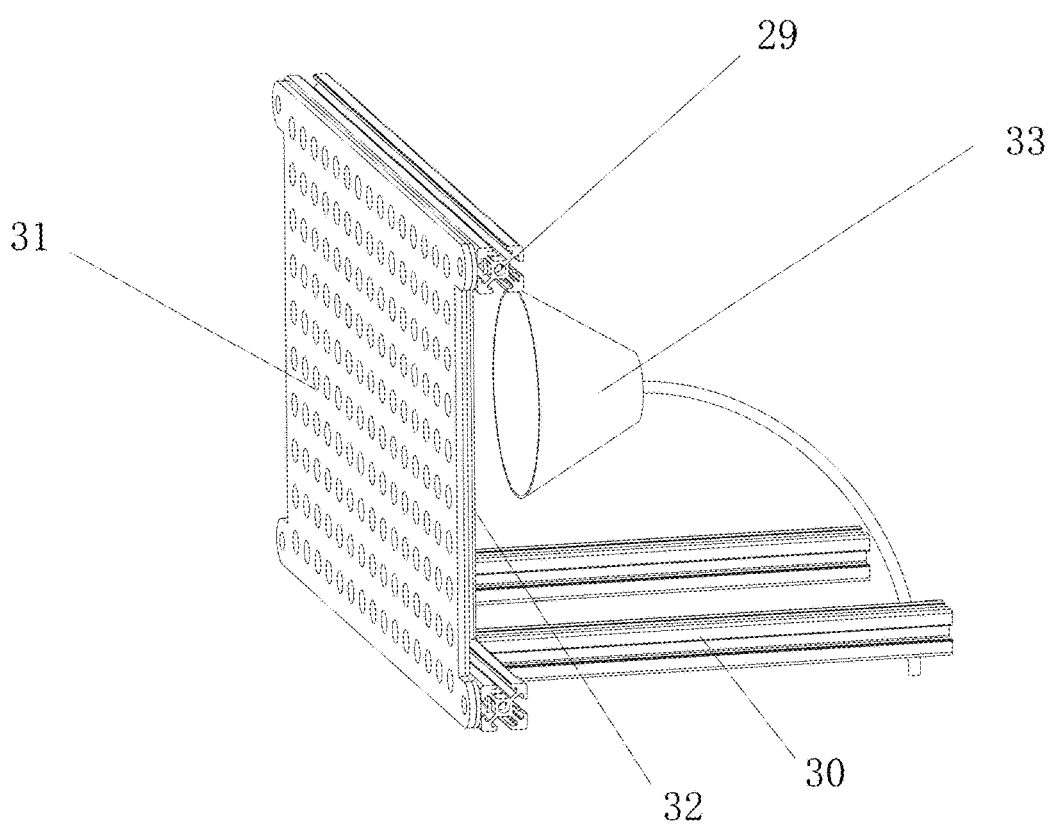
FIG. 10 is a structural view of a calibration device according to an embodiment of the present disclosure.

As shown in FIG. 8 to FIG. 9, the breeder chicken weighing device 13 includes a cross beam 34, T-shaped connectors 14, weighing sensors 15, and a hanging base 16. There are two T-shaped connectors 14, the two T-shaped connectors 14 are fixed to two ends of the frame 1 respectively, and two ends of the cross beam 34 are connected to the two T-shaped connectors 14 via the corresponding weighing sensors 15 respectively. The top of the hanging base 16 is connected to the cross beam 34, and the bottom of the hanging base 16 is connected to the flexible gripper 17. In the present disclosure, two weighing sensors 15 are used. One end of each weighing sensor 15 is mounted on the frame 1 and the other end is mounted on the cross beam 34. The hanging base 16 is directly fixed to the cross beam 34, and the hanging base 16 will not be deformed when the chicken is hung up. The obtained image information is more stable and accurate, and the weighing result is more accurate. Therefore, the deformation caused by measuring the breeder chicken is reduced, and the weighing result is more stable and accurate.

As shown in FIG. 4 to FIG. 10, the calibration device 28 includes a calibration stand 29, mounting rods 30, a porous calibration plate 31, a non-porous calibration plate 32, and an infrared heater 33. The calibration stand 29 is arranged on the frame 1 via the mounting rods 30 and is perpendicular to a camera view direction of the infrared camera 4. The porous calibration plate 31 and the non-porous calibration plate 32 are arranged on the calibration stand 29, the porous calibration plate 31 is arranged in front of the non-porous calibration plate 32, and the infrared heater 33 is arranged on the frame 1 and faces the non-porous calibration plate 32. The calibration device 28 can effectively reduce the influence of different resolutions of the visible-light cameras and the infrared camera 4 on shooting data, and improve the measurement precision of image information.

The infrared heater 33 includes a heating block, a heat collecting hood, and a power supply. The heating block is arranged in the heat collecting hood, and the heat collecting hood is arranged on the frame 1, so as to reduce heat dissipation.

The working principle of the calibration device 28 is as follows:

The relative positions of the infrared camera 4 and the primary visible-light camera 5 to the porous calibration plate 31 are determined, and the number and the distance relationship of circular holes on the porous calibration plate 31 are also determined. Therefore, in a case where the positions of the infrared camera and the primary visible-light camera to the porous calibration plate are determined, the non-porous calibration plate 32 and the porous calibration plate 31 are heated by the infrared heater 33, whereby a temperature difference occurs between the non-porous calibration plate 32 and the porous calibration plate 31. At this moment, the infrared camera 4 acquires a circular hole temperature image by shooting, and the primary visible-light camera 5 obtains an overall image of the calibration plate by shooting, and then a circular hole position in the image is analyzed, whereby a coordinate relationship conversion formula between the infrared camera 4 and the primary visible-light camera 5 may be obtained, and then two kinds of image information are combined to improve the measurement precision.

The breeder chicken identity collection device includes a RFID 35 and an operating panel 2. The operating panel 2 is arranged at the top of the frame 1, the RFID 35 is arranged in the operating panel 2, and the breeder chicken identity collection device is configured for rapid identification of breeder chicken identity information.

Figure 11:
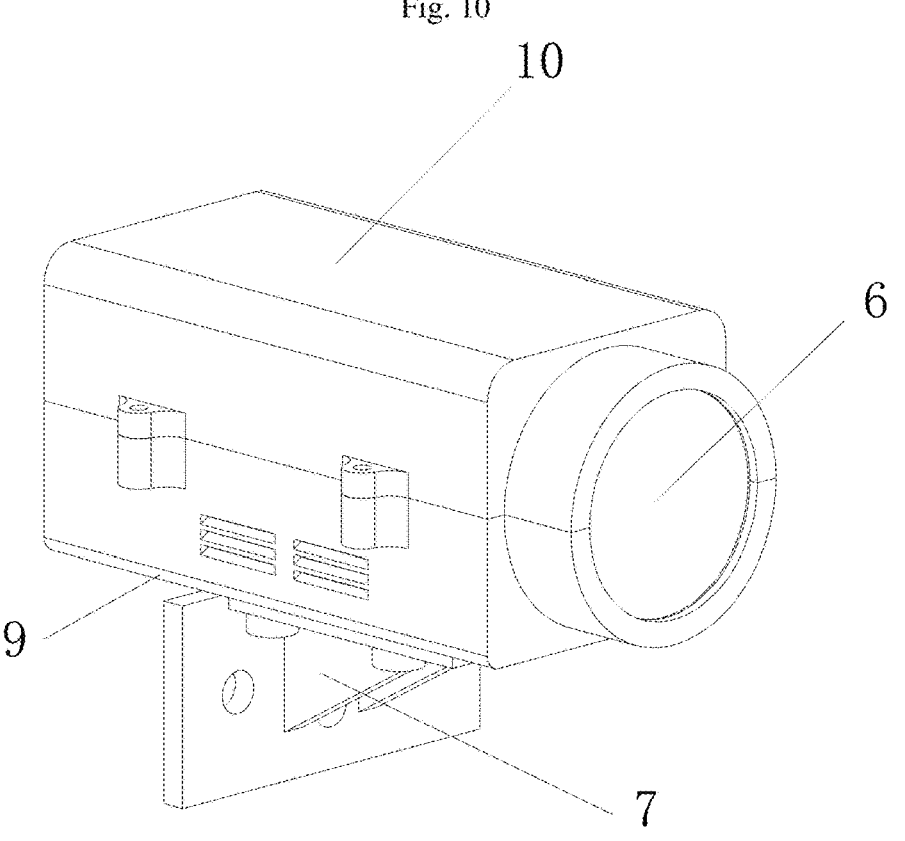
FIG. 11 is a structural view of a dust hood according to an embodiment of the present disclosure.
Figure 12:
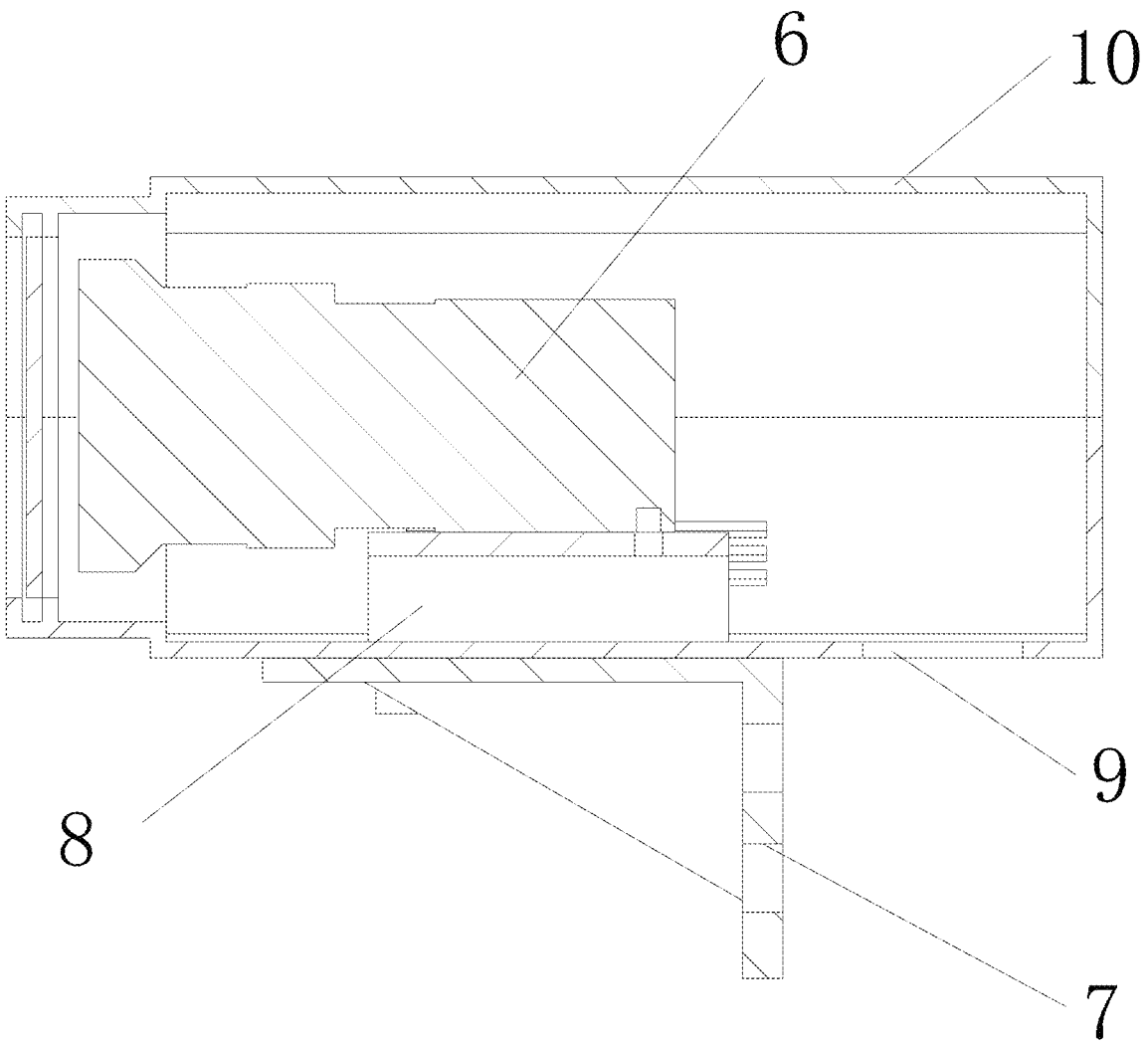
FIG. 12 is a sectional view of a dust hood according to an embodiment of the present disclosure.

As shown in FIG. 11 to FIG. 12, the secondary visible-light camera 6 is arranged inside a dust hood. The dust hood includes a bracket 7, a camera base 8, a dust hood bottom shell 9, a dust hood cover 10, and a transparent lens. The bracket 7 is arranged on the frame 1, and the dust hood bottom shell 9 is arranged on the bracket 7. The camera base 8 is arranged on the dust hood bottom shell 9, and the dust hood cover 10 is arranged on the dust hood bottom shell 9. The transparent lens is arranged in the front of the dust hood. The dust hood can effectively reduce the influence of dust on camera shooting, thereby prolonging the service life of the camera.

The frame 1 is of a rectangular parallelepiped structure. Wind shields 11 are arranged around the frame 1, four pulleys are arranged at the bottom of the frame 1, and a chicken inlet-outlet window is arranged in the front of the frame 1. A light shield 12 is arranged beside the chicken inlet-outlet window. The light shield 12 can effectively reduce the influence of a light source on shooting, thereby improving shooting quality.

In the description of the present disclosure, it should be noted that the terms "arrangement", "mounting", and "connection" are understood broadly unless otherwise expressly specified and agreed. For example, the connection may be a fixed connection, a detachable connection, or an integrated connection. The connection may be a mechanical connection or an electrical connection. The connection may be a direct connection, an indirect connection via an intermediate medium, or an internal communication between two elements. The specific meanings of the above terms in the present disclosure may be understood by a person of ordinary skill in the art on a case-by-case basis.

The above embodiments are preferred implementations of the present disclosure, but the implementations of the present disclosure are not limited by the above embodiments. Any other changes, modifications, substitutions, combinations, and simplifications made without departing from the spirit and principles of the present disclosure should be construed as equivalent substitutions within the protection scope of the present disclosure.

The invention claimed is:

1. A flexible gripper, comprising a hanging handle, a rod piece, a plate piece, a gripping bar made of a flexible material, and an adjusting device, wherein a top of the rod piece is arranged on the hanging handle, the plate piece is arranged at a bottom of the rod piece, the gripping bar is bent to form a gripping groove, and one end of an opening of the gripping groove is fixed to a lower end of the rod piece via the plate piece; the adjusting device comprises a connecting plate, a sliding groove, a sliding rod, a connecting rod, an adjusting handle, and a spring; the connecting plate is arranged in a middle of the hanging handle; the sliding groove is fixed to a lower part of the connecting plate; the sliding rod is arranged in the sliding groove and is connected to another end of the opening of the gripping groove; one end of the connecting rod is arranged on the adjusting handle and another end of the connecting rod is arranged on the sliding rod; the adjusting handle is slidably connected to the connecting plate; and one end of the spring is arranged on the adjusting handle and another end of the spring is arranged at a bottom of the connecting plate.

2. The flexible gripper according to claim 1, wherein there are two rod pieces, and the two rod pieces are fixed to two ends of the hanging handle respectively; there are two connecting plates, an upper end of each of the two connecting plates is fixed to the middle of the hanging handle, and the two connecting plates are arranged in parallel to form a sliding rail; the adjusting handle is arranged in the sliding rail; there are two sliding rods and two connecting rods, a middle of the sliding groove is fixed to the sliding rail, and the two sliding rods are located at two ends of the sliding groove; and an inner end of each of the two sliding rods is connected to the handle via a corresponding connecting rod of the two connecting rods.

3. The flexible gripper according to claim 2, wherein a guide groove is arranged in a middles of each of the connecting plates, and the adjusting handle is connected to the guide groove via a guide block.

4. The flexible gripper according to claim 1, wherein the gripping groove is U-shaped or V-shaped.

5. A breeder chicken parameter measurement instrument with visible-light and infrared cameras combined, comprising a frame, a camera device, an all-in-one touch computer, and the flexible gripper according to claim 1, wherein the camera device, the flexible gripper, and the all-in-one touch computer are all arranged on the frame; the camera device is connected to the all-in-one touch computer, and the camera device comprises an infrared camera, a primary visible-light camera, and a secondary visible-light camera; the infrared camera and the primary visible-light camera are arranged in juxtaposition, and shooting lenses of the infrared camera and the primary visible-light camera and a shooting lens of the secondary visible-light camera are oriented perpendicularly to each other; and the shooting lenses of the infrared camera, the primary visible-light camera, and the secondary visible-light camera all face the flexible gripper.

6. The breeder chicken parameter measurement instrument with visible-light and infrared cameras combined according to claim 5, further comprising a breeder chicken weighing device, wherein the breeder chicken weighing device comprises a cross beam, T-shaped connectors, weighing sensors, and a hanging base; there are two T-shaped connectors, the two T-shaped connectors are fixed to two ends of the frame respectively, and each of two ends of the cross beam is connected to each of the two T-shaped connectors via a corresponding weighing sensor of the weighing sensors; and a top of the hanging base is connected to the cross beam, and a bottom of the hanging base is connected to the flexible gripper.

7. The breeder chicken parameter measurement instrument with visible-light and infrared cameras combined according to right claim 5, further comprising a calibration device, wherein the calibration device comprises a calibration stand, a mounting rod, a porous calibration plate, a non-porous calibration plate, and an infrared heater; the calibration stand is arranged on the frame via the mounting rod and is perpendicular to a camera view direction of the infrared camera; and the porous calibration plate and the non-porous calibration plate are arranged on the calibration stand, the porous calibration plate is arranged in front of the non-porous calibration plate, and the infrared heater is arranged on the frame.

8. The breeder chicken parameter measurement instrument with visible-light and infrared cameras combined according to right claim 7, wherein the infrared heater comprises a heating block, a heat collecting hood, and a power supply; and the heating block is arranged in the heat collecting hood, and the heat collecting hood is arranged on the frame.

9. The breeder chicken parameter measurement instrument with visible-light and infrared cameras combined according to claim 5, wherein the camera device further comprises a dust hood; the dust hood comprises a bracket, a camera base, a dust hood bottom shell, a dust hood cover, and a transparent lens; the bracket is arranged on the frame, and the dust hood bottom shell is arranged on the bracket; and a bottom of the dust hood cover is connected to a top of the dust hood bottom shell to form a mounting cavity, the secondary visible-light camera is mounted in the mounting cavity via the camera base, and the transparent lens is arranged in front of the mounting cavity.

10. The breeder chicken parameter measurement instrument with visible-light and infrared cameras combined according to claim 5, wherein wind shields are arranged around the frame, a chicken inlet-outlet window is arranged in front of the frame, and a light shield is arranged beside the chicken inlet-outlet window.

* * * * *